Jan. 23, 1962
C. W. CHRISTMAN
3,017,971
CELLULAR CORED PANELS AND CONTINUOUS PROCESS
FOR MANUFACTURING SAME
Filed March 24, 1958
4 Sheets-Sheet 1
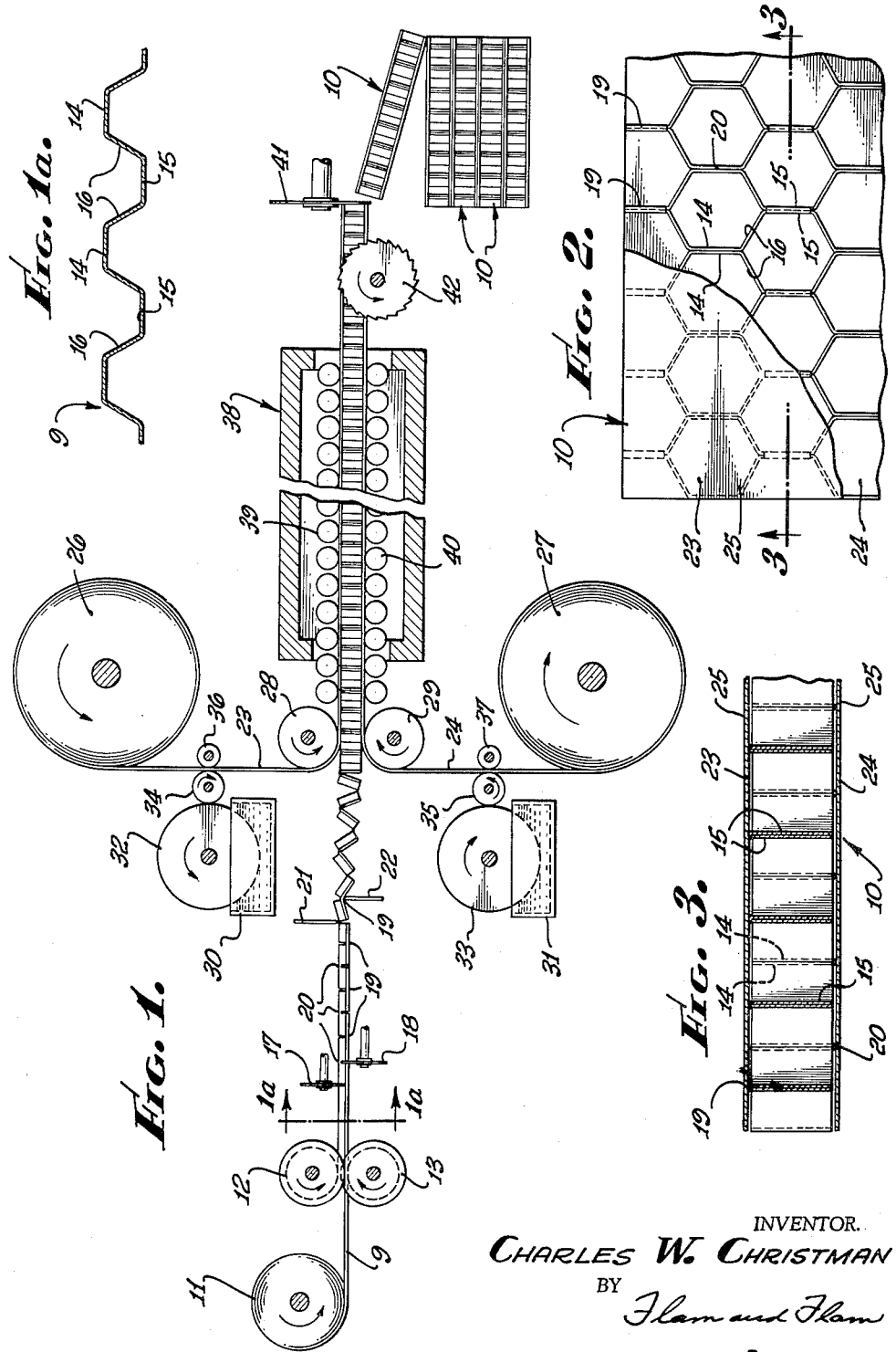
INVENTOR.
CHARLES W. CHRISTMAN
BY
*Flam and Flam*
ATTORNEYS.

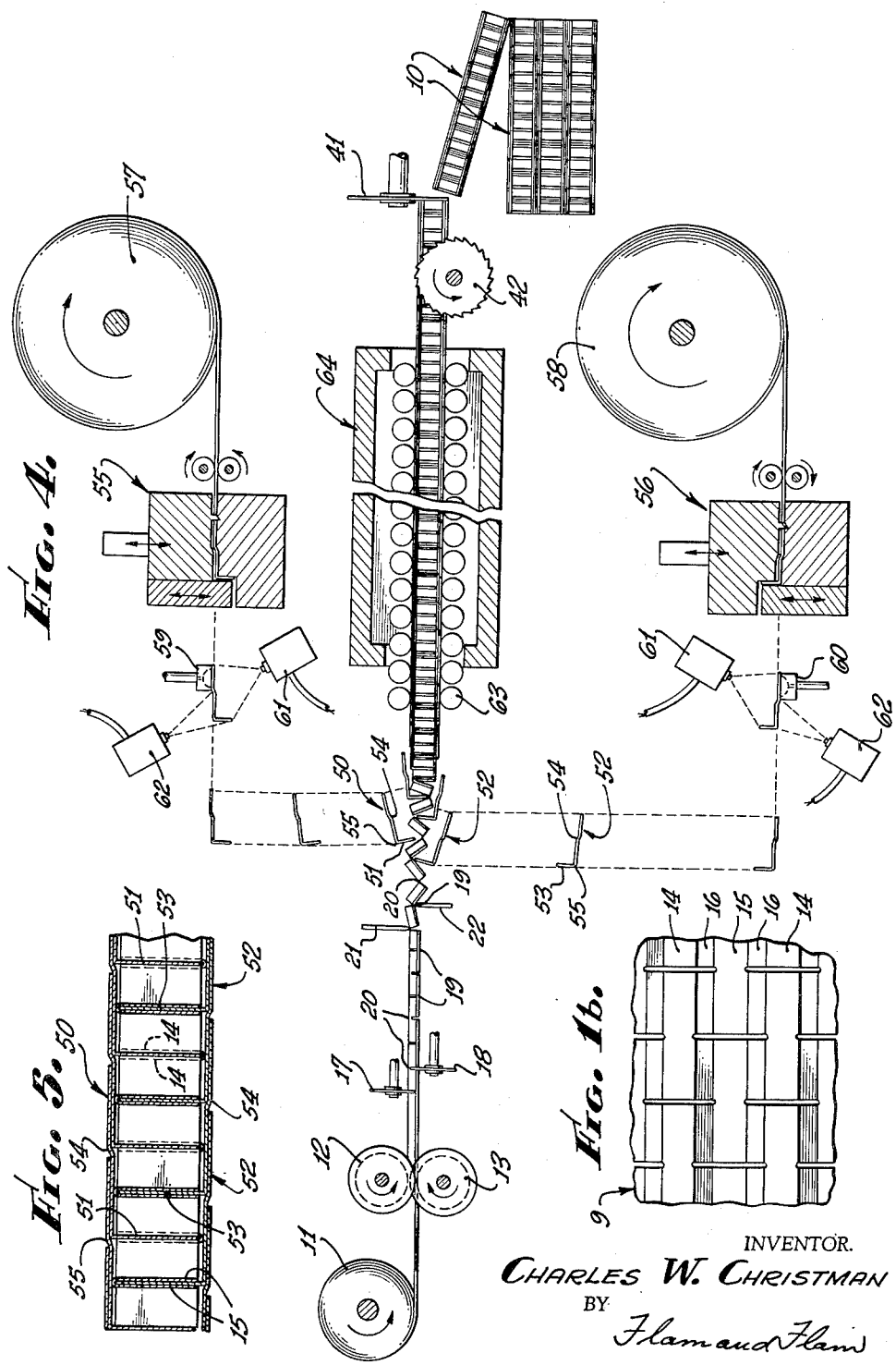

Jan. 23, 1962 C. W. CHRISTMAN 3,017,971
CELLULAR CORED PANELS AND CONTINUOUS PROCESS
FOR MANUFACTURING SAME
Filed March 24, 1958 4 Sheets-Sheet 3
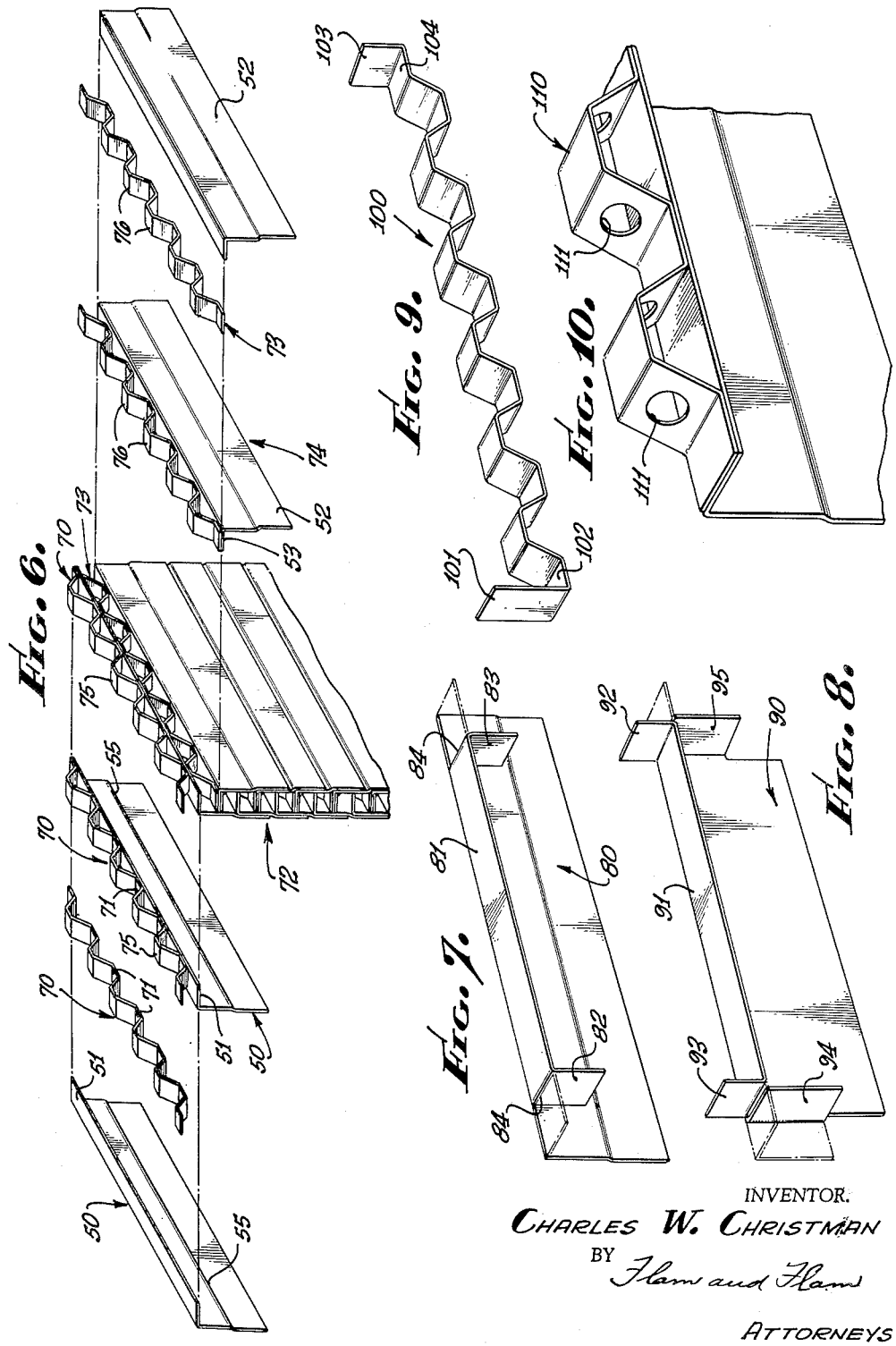
INVENTOR.
CHARLES W. CHRISTMAN
BY
ATTORNEYS

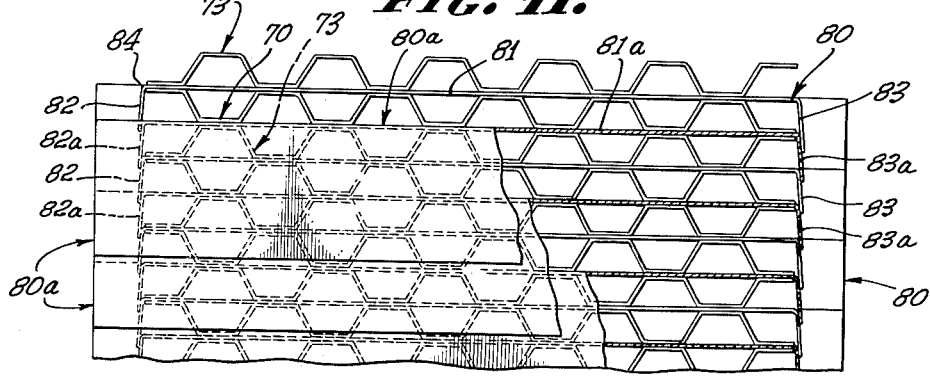
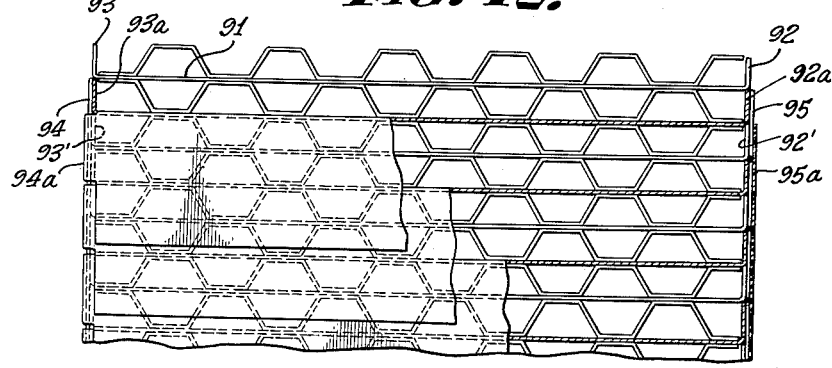
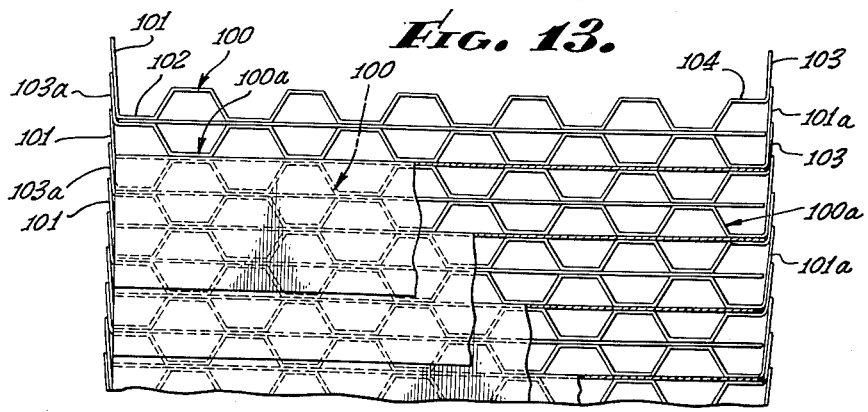

United States Patent Office 3,017,971
Patented Jan. 23, 1962

3,017,971
CELLULAR CORED PANELS AND CONTINUOUS PROCESS FOR MANUFACTURING SAME
Charles W. Christman, Los Angeles, Calif., assignor to Formacel, Inc., Los Angeles, Calif., a corporation of California
Filed Mar. 24, 1958, Ser. No. 723,372
7 Claims. (Cl. 189—34)

This invention relates to cellular cored panels, and particularly to mechanized and continuous processes for manufacture thereof.

Cellular core material has in the past been produced by securing together fluted or sinuous straps, adjacent strips having opposite orientations so that, instead of a nested relationship, spaced cells are formed between each pair of strips. Sheet covering material is subsequently secured to opposite sides of the cellular material to provide an enclosure. Such material may be used, for example, in airplane sections. Column-type reinforcement is thus achieved with minimum weight.

In my copending application, Serial No. 655,760, filed April 29, 1957, now Patent No. 2,933,122, Patented April 19, 1960, and entitled Cellular Core Material, and Method of Making Same, there is disclosed a continuous step process for manufacturing the cellular material by accordion bending of generally sinuous material. An object of this invention is to incorporate in a continuous process novel means for applying covering material to cellular core so manufactured.

Another object of this invention is to provide novel elemental closure plates and novel processes for assembling them with the cell material to form cored panels.

Another object of this invention is to provide elemental plates of this character that close not only the top and bottom of the cell material but also the opposite sides thereof.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a diagrammatic view illustrating a continuous step process comprising one form of this invention;

FIG. 1a is a sectional view, taken along a plane indicated by line 1a—1a of FIG. 1;

FIG. 1b is a plan view showing the cuts in the sinuous material;

FIG. 2 is an enlarged plan view illustrating the cellular core material constructed in accordance with the process diagrammatized in FIG. 1, a portion of the enclosing or covering material being broken away for purposes of clarity;

FIG. 3 is a sectional view, taken along a plane indicated by line 3—3 of FIG. 2;

FIG. 4 diagrammatically illustrates another continuous process for making cored panels;

FIG. 5 is a view similar to FIG. 3, but illustrating a transverse section of the cored panels made in accordance with the process diagrammatized in FIG. 4;

FIG. 6 diagrammatically illustrates still another process similar to the process illustrated in FIG. 4 for making cored panels;

FIGS. 7 and 8 illustrate modifications of enclosing segments for use either in the processes illustrated in FIGS. 4 or 6 and whereby side closures are provided;

FIG. 9 illustrates a form of strip material usable in the process illustrated in FIG. 6 and whereby side closures are formed;

FIG. 10 illustrates a fluted strip provided with apertures for passage of cables, tubing or the like transversely through the cellular core material; and FIGS. 11, 12 and 13 illustrate longitudinal sectional views of cored panels made respectively by the strips of FIGS. 7, 8 and 9.

Referring to FIGS. 1, 2 and 3, the apparatus illustrated in FIG. 1 produces cored panels 10. Material 9 from a feed roll 11 at the left-hand portion of FIG. 1 passes between forming rollers 12 and 13. The forming rollers provide a uniformly fluted or sinuous transverse configuration to the material 9, as illustrated clearly in FIG. 1a. Alternate crests 14 and troughs 15 are formed which are joined to each other by side walls 16.

The crests 14, troughs 15 and side walls 16 are, in the present instance, each of uniform width, and the side walls 16 extend at angles of 120° to both the crests 14 and the troughs 15. Thus, a trough and the two side wall sections 16 adjacent thereto can form the lower part of a hexagonal cell element; and a crest and its two adjacent side walls 16 can form the upper half of an interfitting hexagonal cell element, when the sinuous material is folded or bent in a manner to be described. Other configurations can be provided, the hexagonal arrangement being merely an example.

The material 9, after leaving the forming rollers 12 and 13, is transversely cut, as by cutters 17 and 18. The upper cutter 17 slits all of the side walls 16 and the crests 14, leaving only the troughs 15 intact. There is thus produced an axis 19 at the troughs 15 of low bending resistance for localizing the bending action. The lower cutter 18 is spaced longitudinally from the upper cutter 17. It slits the troughs 15 and all of the side wall sections 16, leaving only the crests 14 intact. There is thus provided another axis 20 falling along the crests 14 about which the material can be readily bent. The configuration produced by the cutters is illustrated in FIG. 1b. The material is intermittently advanced twice the spacing between the cutters 17 and 18, and the cutting operation is repeated. There are thus produced interspaced sets of bending axes 19 and 20.

Bending dies, two of which 21 and 22 are illustrated in FIG. 1, accordion fold the material by respectively bending about the axes 19 and 20. The bending die 21 and others operating at the axes 20 cause crests 14 of adjacent elements to be placed in contact and as illustrated at 14—14 in FIG. 2. The bending die 22 and others operating at the axes 19 cause adjacent troughs to be placed in engagement, as designated at 15—15 in FIG. 2. It will thus be appreciated that a cellular core is continuously produced by the forming rollers, cutters and bending dies.

After the cell core itself is formed, covering materials 23 and 24 are applied to opposite sides thereof to form top and bottom enclosing plates 25 (FIG. 3). The covering material 23 is applied to the top of the cells and the material 24 to the bottom as the cells progress to the right, as viewed in FIG. 1. Materials 23 and 24 are supplied from supply rollers 26 and 27 located above and below the line of progress of the cell material. Rollers 28 and 29, about which the materials 23 and 24 respectively pass, appropriately guide the material for tangent application along the upper and lower planes of the cells.

In order to secure the covering material 23, for example, to the cell material 9, brazing processes may be used. In this case, the covering materials 23 and 24 and the cell material are made of material suitable for brazing. Brazing flux is applied to the covering materials 23 and 24. A pump, in the form of a roller 32, lifts metered quantities of fluid flux from a container 30. A transfer roller 34, engaging the pump roller 32 and one side of the covering material 23, applies a thin coating of flux. A backing roller 36, on that side of the material 23 opposite the transfer roller, holds the material 23 in position. A pump roller 33, container 31, transfer roller 35 and backing roller 37 are provided for the material 24.

The covered cells pass into a brazing oven 38. Several sets of pressure rollers 39 and 40 on opposite sides of the cell core material hold the covering materials 23 and 24 firmly into engagement with edges at the top and bottom surfaces of the cell material in the oven 38. The oven 38 is shown as of indefinite length; its dimensions are suited to the travel of the material through it; and it may be heated to an appropriate temperature either electrically or by aid of gaseous or liquid fuel.

The process illustrated may also be used to cement the materials together by means of a thermosetting or catalyzed bonding agent. In this case, the containers hold a thermosetting or catalyzed bonding agent, and the temperature of the oven 38 is adjusted for appropriate curing.

As the material exits the oven 38, the units 10 are cut to the desired size. A rotary cutter or saw 41, operable for example once every eight steps of advancement of the material 9, cuts the panels 10 to length, and continuously operable rotary cutters 42 determine the width of the panels. The rotary cutters 42 may be used for purposes of trimming the side edges of the material, the width of the panels 10 being controlled, at least generally, by the width of the material at the supply roller 11 and by the forming rollers 12 and 13.

The process illustrated may be modified to facilitate securing of the members by welding processes. In this instance, welding equipment will be substituted for the curing or brazing oven 38.

In FIG. 4, an alternate method is provided for applying covering material for the cell structure. The cell material, apart from its covering, is made in the same manner as illustrated in FIG. 1. Thus, there are provided a supply roller 11, forming rollers 12 and 13, cutters 17 and 18 and bending dies 21 and 22.

Angled plates 50 have flanges 51 at one end that are inserted between the crests 14 that would otherwise directly engage each other by bending about the axes 20; and similar angled plates 52 have flanges 53 received between the troughs 15 that would otherwise be placed in engagement with each other by bending about the axes 19. The plates 50 and 52 extend forwardly relative to the progress of the cell material and overlap the plates inserted between the preceding crests or troughs.

To ensure intimate engagement betwetween the plates at the edges of the cell material where there is no overlap, an intermediate offset 54 is provided, corresponding to the thickness of the plates themselves. The offset 54 is located from the bend 55 forming the flange 51 a distance corresponding to the cell dimension, which dimension corresponds to the spacing between insertion positions of adjacent plates 50 (see FIG. 5).

The plates 50 and 52 are formed by bending and cutting dies 55 and 56 supplied from rolls of material 57 and 58. The dies 55 and 56 each operate to produce one plate for each advancement step of the cell material.

In order firmly to affix the plates 50 and 52 to the cell material, appropriate bonding material or brazing flux is applied to the plates in advance of their insertion between the cell elements. Vacuum cup holders 59 and 60 respectively for the plates 50 and 52 engage the forward outer areas of the plates. These areas correspond to the areas that will be exposed exteriorly of the panels 10.

The holders 59 and 60 form shields during application of the flux or bonding material, as by spring devices 61 and 62. The spray device 61 coats the entire inner area of the plate 50 completely; and the other spray device 62 covers that outer area which will be engaged by the succeeding plate.

The holder 59 is used for carrying the plate 50 to the area of insertion between the cell elements so that interference with the flux or bonding material applied to the plates is avoided. The holders 59 and 60 receive the plates 50 and 52 from the presses or dies 55 and 56.

After the plates 50 and 52 are inserted between the cells, the covered core material passes between sets of pressure rollers 63 and into a curing or brazing oven 64. The plates in this instance provide two thicknesses of material for covering purposes. If desired, the plates may be lengthened and provided with additional offsets for increasing the thickness of the covering.

In FIG. 6, there is illustrated an alternate process for making cored panels by the aid of the plates 50 and 52. Separate sinuous strips 70 are placed upon the outer surface of the flange 51 of the plate 50. Troughs 71 of the strips are welded or otherwise suitably affixed to the flange 51. The assembled strips 70 and plates 50 are fed from the left, as viewed in FIG. 6, to an assembly station 72. Similarly, the plates 52 with strips 73 are fed to the assembly station from the right.

At the assembly station, the flange 53 of one of the plates 52 projects over and rests upon the crests of the previously assembled plates 50, and the main portion of the plate 52 extends along the right-hand side of the stack to form an elemental enclosure. If desired, the flange 53 may be spot-welded to the crests 75 of the preceding unit. Optionally the entire unit may be held together as by bonding material or by brazing, as described in the previous forms.

When the unit 73—52 is in place, a unit 70—50 is placed on top of the crests 76 of the strips 73, and the process is repeated. During this process, the assembled stack, as at 72, may be indexed downwardly corresponding to half the cell thickness.

It will be noted that the crests 75 of the units to the left are offset relative to the crests 76 of the units from the right. This is vital in order to achieve the cellular formation. This relationship conveniently can be achieved even though the strips 70 and 73 are identical. Thus, it will be noted that the strips 70 and 73 terminate at opposite ends respectively in trough and crest areas. Hence, the relative offset between the units can be achieved by merely reversing the transverse orientation of the elements or by relatively rotating them 180°.

In FIGS. 7–9 and 11–13, there are illustrated plate structures which will provide end enclosures as well as top and bottom enclosures for the cellular core material in the process illustrated either in FIG. 4 or FIG. 6.

The plate 80 in FIGS. 7 and 11, otherwise identical to the plate 50, has a flange 81 similar to the flange 51. However, the ends of the flange 81 are bent inwardly to form tabs 82 and 83. As shown in FIG. 11, the bends 84 forming the tabs 82 and 83 are located inwardly from the side edges of the plate 80 a distance slightly in excess of the thickness of the strip 70. Similar plates 80a are provided for the other strips 73, as in FIG. 6. The tabs 82 and 83 for the plates 80 overlap slightly the tabs 82a and 83a of the companion plate 80a, and a complete side enclosure is formed.

In the form illustrated in FIGS. 8 and 12, the plate 90 has a flange 91, the ends of which are bent upwardly instead of downwardly to form tabs 92 and 93. The ends of the main body of the plate 90 are also inwardly bent to form side flanges 94 and 95. The flanges 94 and 95 extend in planes laterally beyond the tabs 93 and 92 to form spaces for reception of tabs 92a and 93a of the companion plate 90a at that area adjacent the flange 91, and for reception of the tabs 92' and 93' of the next plate 90' corresponding to the plate 90. The side flanges 94a and 95a of the companion plates operate similarly, except that they also encompass the side flanges of the plates 90.

In FIGS. 9 and 13, there is illustrated a sinuous strip 100 usable in the process illustrated in FIG. 6 and which provides an enclosure. The strip 100 has a tab 101 extending upwardly from its end through element 102 a distance slightly in excess of the cell dimension; and the strip 100 has a tab 103 extending upwardly from the end crest 104 at the opposite side, the distance of the tab 103 being slightly greater than half the cell dimension.

As shown in FIG. 13, successive strips are alternately oriented. The tab 101 is overlapped by the shorter tab 103a of the succeeding strip 100a, which is reversely oriented. The tab 103a is in turn overlapped by the longer tab 101 of the next strip. An enclosure is thus formed at the left side. Similarly the tabs 103 and 101a overlap on the right-hand side. A complete enclosure is thus formed in a simple manner.

In FIG. 10, there is illustrated a strip 110 having a series of apertures 111 that permit passage of conduits, wires or the like transversely through the cells.

The inventor claims:

1. In combination: a plurality of sinuous strips having crests on one side and troughs on the other, said strips also having top and bottom edges; a plate for each alternate strip, and secured to the bottom edge of the corresponding strip; a plate for each other alternate strip, and secured to the top edge of the corresponding strip; the plates and strips being serially joined in staggered sequence so that successive strips are located in side-by-side relationship to form cells, and so that the plates form top and bottom enclosures for the cells.

2. In combination: a plurality of sinuous strips having crests on one side and troughs on the other, said strips also having top and bottom edges; a plate for each alternate strip, and secured to the bottom edge of the corresponding strip; a plate for each other alternate strip, and secured to the top edge of the corresponding strip; the plates and strips being serially joined in staggered sequence so that successive strips are located in side-by-side relationship to form cells, and so that the plates form top and bottom enclosures for the cells; the plates extending beyond the corresponding strips to extend in successive overlapping relationship.

3. An enclosed cellular structure, comprising two series of units each including a flanged plate member and a sinuous strip member having crests secured to the flanged member; the series of units interfitting each other in staggered relationship so that the plate members of the respective series of units extend on opposite sides of the structure and so that the strip members complement each other in sequence to provide cells; one of said members of each unit having tabs at opposite sides to form side closures for the structure.

4. In combination: a series of sinuous strips, each having crests and troughs at opposite sides, and having top and bottom edges; the strips being arrayed in side-by-side relationship to form a cellular structure; a first set of plates extending in successive overlapping relationship along the top edges of the strips, the plates having flanges at corresponding sides entering between the strips of successive pairs of strips; a second set of plates extending in successive overlapping relationship along the bottom edges of the strips, the plates of said second set also having flanges at corresponding sides entering between the strips of successive pairs of strips; and means for securing the plates and the strips together to form a unitary structure.

5. In combination: a series of sinuous strips, each having crests and troughs at opposite sides, and having top and bottom edges; the strips being arrayed in side-by-side relationship to form a cellular structure; a first set of plates extending in successive overlapping relationship along the top edges of the strips, the plates having flanges at corresponding sides entering between the strips of successive pairs of strips; a second set of plates extending in successive overlapping relationship along the bottom edges of the strips, the plates of said second set also having flanges at corresponding sides entering between the strips of successive pairs of strips, the flanges of the respective sets being located in staggered relationship so that the flanges of the sets alternate along successive strips; and means for securing the plates and the strips together to form a unitary structure.

6. The combination as set forth in claim 5, in which the strips are endlessly joined together in accordion-folded fashion.

7. The combination as set forth in claim 5, in which the strips are separate, and individually secured to a corresponding plate.

References Cited in the file of this patent

UNITED STATES PATENTS

| | | |
|---|---|---|
| 684,822 | Huckstep | Oct. 22, 1901 |
| 2,720,949 | Pajak | Oct. 18, 1955 |
| 2,746,139 | Pappelendam | May 22, 1956 |
| 2,756,496 | Holland | July 31, 1956 |
| 2,778,458 | Briggs | Jan. 22, 1957 |
| 2,796,157 | Ginsberg | June 18, 1957 |
| 2,833,682 | De Laszlo | May 6, 1958 |